Sept. 14, 1954     E. C. KIEKHAEFER     2,689,141
ADJUSTABLE RING CLAMP
Filed Jan. 7, 1952
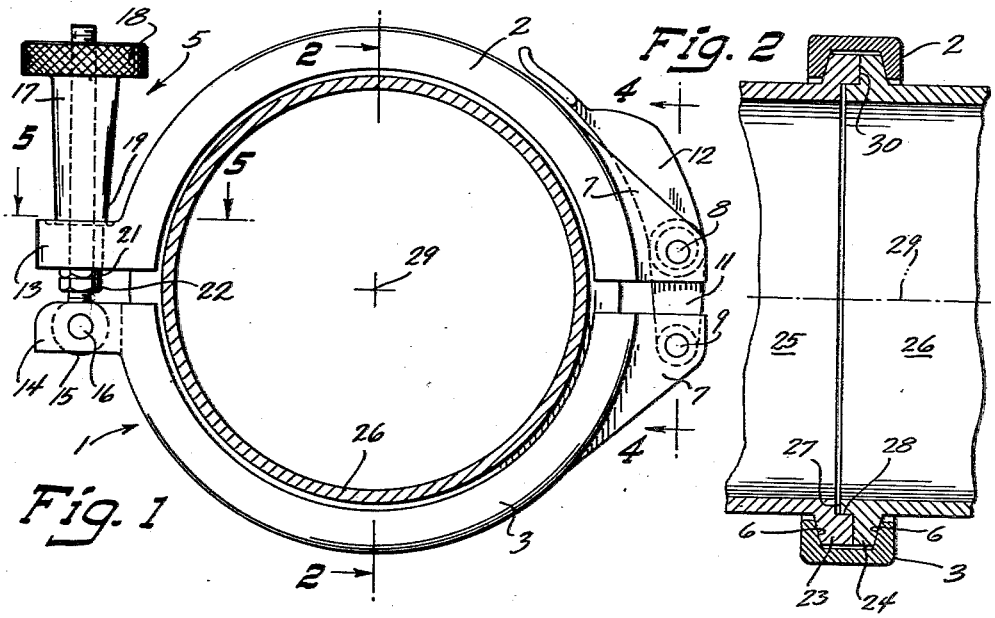
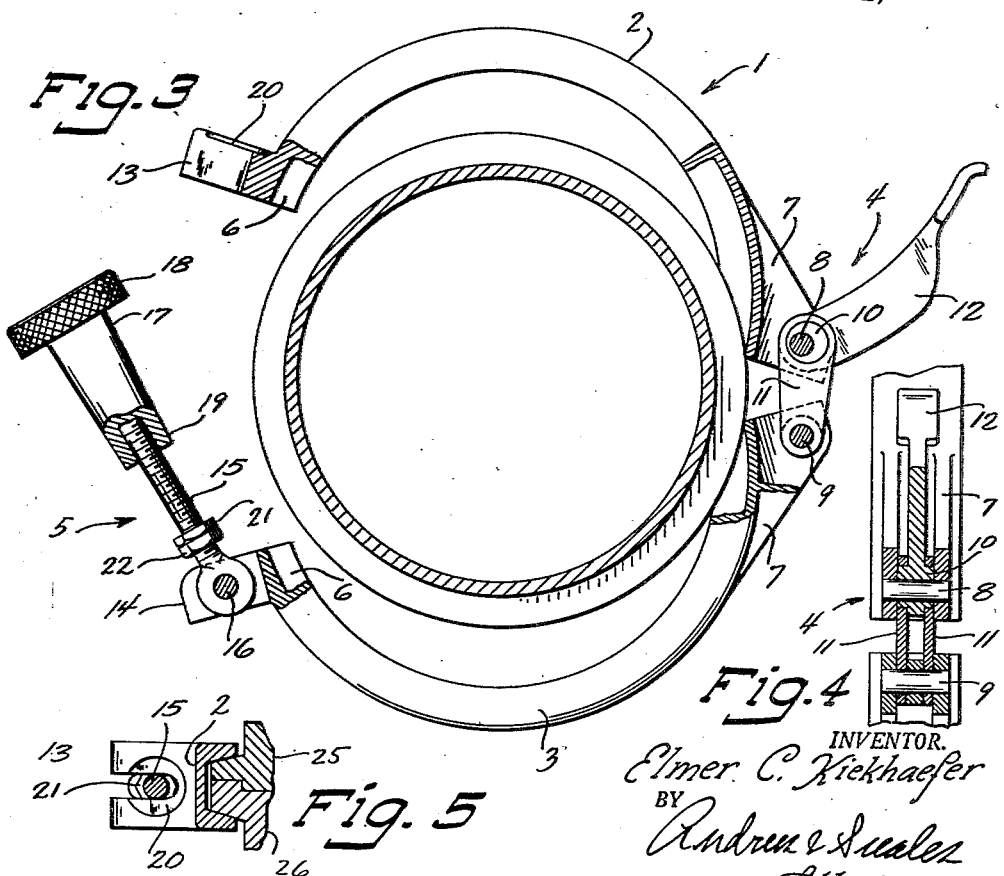
INVENTOR.
Elmer C. Kiekhaefer
BY
Andrus & Sceales
Attorneys Patented Sept. 14, 1954

2,689,141

UNITED STATES PATENT OFFICE 2,689,141

ADJUSTABLE RING CLAMP

Elmer C. Kiekhaefer, Cedarburg, Wis.

Application January 7, 1952, Serial No. 265,352

5 Claims. (Cl. 285—129)

This invention relates to circumferential clamp rings for joining separable members and particularly to adjustment means therefor.

The invention is directed to a ring clamp having a toggle release lever for loosening the clamp permitting relative rotation of the secured parts and a separate releasable means connecting the ends of the clamp ring and allowing the clamp to be opened and the parts disjoined. The invention provides an adjustable and releasable connection whereby the size of the ring may be adjusted to control the tension of the clamp when tightened by the toggle, and whereby after release, the connection may be reestablished as previously adjusted.

The invention provides specifically, screw means for opening the clamp to release the elements and for adjusting the size of the clamp ring for the desired tension and securement of the elements, and an adjustable abutment for securing the adjustment and for reestablishing the original adjustment in reclosing the ring.

The principal object of the invention is to provide an improved ring lock which is adapted for manipulation in any position and is easily opened and closed and adjusted in size within limits providing the desired tension to secure the structural elements.

Another object of the invention is to eliminate necessary readjustment of the tension of the clamp each time the clamp is either retightened by operation of the toggle or reclosed by resecuring the ends of the clamp ring.

A further object is to provide for the reconnection of the ends of the clamp ring at a given adjustment as previously established.

These and other objects and advantages will be more fully set forth in the following description of a preferred embodiment of the invention as illustrated in the accompanying drawing.

In the drawing:

Figure 1 is a front elevation of the clamp ring securing two separable members;

Fig. 2 is a sectional view taken on line 2—2 of Fig. 1;

Fig. 3 is a view similar to Fig. 1 showing the clamp ring open for removal to allow disjointing of the separable members;

Fig. 4 is a section taken on line 4—4 of Fig. 1; and

Fig. 5 is a section taken on line 5—5 of Fig. 1.

The clamp ring 1 includes the two semi-cylindrical sections 2 and 3 which are joined at corresponding ends by the toggle device 4. The opposite ends are joined by the adjustment means 5 which latter is adapted to vary, within limits, the size of ring 1 as opened and closed by the toggle device.

The sections 2 and 3 of ring 1 are channeled with opposite inner sides 6 defining conical surfaces facing inwardly toward the center of the ring. The lugs 7 are formed integrally with the corresponding ends of sections 2 and 3 joined by toggle device 4 and carry the cross-pins 8 and 9, respectively. The toggle device 4 includes the eccentric 10 mounted on pin 8 between the lugs 7 supporting the pin. The spaced links 11 connect pin 9 and eccentric 10. The toggle lever 12 is joined to eccentric 10 between links 11 to rotate eccentric 10 by manipulation of the lever which moves the center of the eccentric and varies the effective length of link 11 respecting pins 8 and 9.

Lever 12 is shaped to fit flat in a position against ring section 2 with a minimum of projection, and in which position the center of eccentric 10 is disposed over and slightly past upper dead-center respecting link 11. In the position referred to and shown in Fig. 1, the tension of link 11 secures eccentric 10 on pin 8 and the toggle device in the closed position.

The split, projecting lugs 13 and 14, respectively, are formed at the ends of ring sections 2 and 3 oppositely of the toggle device 4. The eye-bolt 15 is pivotally secured between the spaced portions of lug 14 by the pin 16 and is adapted to pivot on pin 16 into a position extending between the spaced portions of lug 13. The adjustment member 17 is threaded on the end of bolt 15 and includes a knurled portion 18 for turning and a stem 19 which is adapted to be seated in the recess 20 formed in the upper faces of lug 13. The nut 21 on bolt 15 is located thereon so as to be turnable against the lower faces of lug 13 and the lock nut 22 on bolt 15 is provided to be turned tight against nut 21 and secure the latter against turning after initial adjustment thereof.

Clamp ring 1 is dimensioned generally to fit over the annular flanges 23 and 24 which are respectively formed integrally with the members 25 and 26 to be joined. Members 25 and 26 comprise separable parts which under various circumstances need to be joined securely and relatively fixed, or relatively rotatable, or disjoined and separated. The rim 27 of member 26 and the overhanging portion of flange 23 of member 25 are provided with accurately formed inter-engaging bearing surfaces as at 28 whereby the members are rotatable on the axis 29 thereof while otherwise relatively secured.

In the operation of the device to secure members 25 and 26 upon assembly as described, ring 1 is mounted on flanges 23 and 24 with lugs 13 and 14 free and unsecured by bolt 15 and toggle device 4 in an open position with lever 12 outward, as shown in Fig. 3.

Thereafter, bolt 15 is pivoted on pin 16 between the split portions of lug 13 and adjustment member 17 is turned on bolt 15 until stem 19 fits into recess 20. The nut 21 is then turned upwardly on bolt 15 to engage the underside of lug 13 and nut 22 is turned tight against nut 21 to lock the latter.

Clamp ring 1, with lugs 13 and 14 secured and toggle device 4 open, is adapted to secure members 25 and 26 while allowing relative rotation or indexing on the axis 29 or rim 27.

When either of members 25 and 26 have been properly indexed, toggle device 4 is closed by pushing lever 12 against the ring which turns eccentric 10 and draws the ends of sections 2 and 3 of the ring together.

The opposite faces 30 of flanges 23 and 24 define conical surfaces developed outwardly of axis 29 and angularly conform with sides 6 of ring sections 2 and 3 to be engaged thereby.

In closing toggle device 4, the circumferential length of ring clamp 1 is shortened whereby the sides 6 of the ring sections 2 and 3 move radially inwardly and wedge the flanges 23 and 24 tightly therebetween. The frictional inter-engagement of faces 30 of flanges 23 and 24 with the sides 6 of ring sections 2 and 3, secures members 25 and 26 firmly together and against rotation.

Because of the limited elasticity and flexibility of the parts where constructed of metal, the tightening action of the clamp ring takes place with a small change in the length of the clamp as effected by the eccentric. Consequently, the operation of the toggle device is very sensitive to the adjustment effected by the turning of member 17 on bolt 15.

Members 25 and 26 can be disjoined by releasing lugs 13 and 14 by turning up member 17 on bolt 15 and without turning nuts 21 and 22. In resecuring lugs 13 and 14, member 17 is turned down on the bolt as described until lug 13 is tight between nut 21 and the member.

Friction means other than nut 22 such as an elastic incorporated in the body of nut 21 may be employed to secure nut 21 against free movement and displacement on bolt 15. The adjustable abutment provided by nut 21 assures in each case the adjustment of member 17 as previously established and the operation of toggle 4 is reestablished automatically and is made immediately operable.

The invention allows removal of the clamp ring 1 while maintaining the desired tension adjustment, and overcomes the disadvantages inherent in splitting of the ring by release of the adjustment device instead of the toggle. Where the toggle device provides for splitting of the ring, the toggle device in open position cannot be relied on to secure the ends of the ring sections for rotation of the parts while joined.

The invention is particularly adapted for use in chain saws and the like as shown and described in the present inventor's copending application entitled, Centrifugal Clutch Unit, Serial No. 302,431, filed August 4, 1952.

Various embodiments of the invention may be employed within the scope of the accompanying claims.

I claim:

1. In a ring clamp of two separate sections permanently joined at corresponding ends by a toggle device including an eccentric pivotally carried by one of said ends and a link joining the other of said ends and said eccentric, said eccentric being manually rotatable to vary within a fixed limit the circumferential dimension of the clamp and the effective clamping thereof, a bolt pivotally secured to one of the opposite ends of said sections and movable adjacent to the corresponding end of the other of said sections, a threaded member relatively movable by turning on said bolt and in a direction into engagement with said last named end, the adjustment of said member determining the effective circumferential dimension of the clamp within the fixed limits of said toggle device, and a nut turnable on said bolt and adapted to be disposed as a fixed limit of movement of said threaded member in said direction whereby the circumferential dimension of the clamp may be repeatedly reestablished as previously adjusted.

2. In a ring clamp of two separate sections permanently joined at corresponding ends by a toggle device including an eccentric pivotally carried by one of said ends and a link joining the other of said ends and said eccentric, said eccentric being manually rotatable to vary within a fixed limit the circumferential dimension of the clamp and the effective clamping thereof, a bolt pivotally secured to one of the opposite ends of said sections and movable adjacent to the corresponding end of the other of said sections, a threaded member relatively movable by turning on said bolt and into and out of engagement with said last named end, the adjusted engagement of said threaded member with said clamp end determining the effective circumferential dimension of the clamp within the fixed limits of said toggle device and the disengagement of said member allowing for opening and removal of the clamp, and a nut turnable on said bolt and adapted to be disposed thereon as a fixed stop limiting the engagement of said threaded member whereby the circumferential dimension of the clamp may be repeatedly reestablished as previously adjusted.

3. In a ring clamp of two separate sections permanently joined at corresponding ends by a toggle device including an eccentric pivotally carried by one of said ends and a link joining the other of said ends and said eccentric, said eccentric being manually rotatable to vary within a fixed limit the circumferential dimension of the clamp and the effective clamping thereof, a bolt pivotally secured to the opposite end of one of said sections, a recessed split lug projecting from the corresponding end of the other of said sections and disposed to receive said bolt, a threaded member relatively movable by turning on said bolt and into and out of a recess formed in said lug, the adjustment of said threaded member on said bolt selectively determining the effective circumferential dimension of the clamp within the fixed limits of said toggle device and the withdrawal of said member from said recess allowing for opening of the clamp, and a nut turnable on said bolt and adapted to be engaged by said lug as a fixed stop limiting the first named adjustment of said threaded member whereby the circumferential dimension of the clamp may be repeatedly reestablished as previously adjusted.

4. A clamp device for selectively securing separate machine elements rigidly or allowing relative rotation thereof, comprising a pair of annular flanges secured to each element and disposed to be joined in face-to-face relation, a ring clamp of two separate parts of U-shaped section adapted to fit over said flanges and join the latter in face-to-face relation, a toggle device joining corresponding ends of said parts and including an eccentric pivotally carried by one of said ends and a link joining the other of said ends and said eccentric, said eccentric being manually rotatable to vary within a fixed limit the circumferential dimension of the clamp and the effective clamping thereof, a bolt pivotally secured to the other end of one of said parts, a split lug projecting from the corresponding end of the other of said parts and disposed to receive said bolt, a threaded member relatively movable by turning on said bolt and into and out of facial engagement with said lug, the adjustment of said member on said bolt selectively determining the effective circumferential dimension of the clamp within the fixed limits of said toggle device and the loosening of said member from facial engagement with said lug allowing for opening of the clamp and the removal of the clamp from said flanges for disjoining the machine elements, and a nut turnable on said bolt and adapted to be engaged by said lug as a fixed stop limiting the first named adjustment of said threaded member whereby the circumferential dimension of the clamp may be repeatedly reestablished as previously adjusted within the limits of said toggle device whereby said elements may be selectively firmly secured and allowed relative rotation on the axis of said flanges.

5. A clamp device for securing separate machine elements rigidly or allowing relative rotation thereof, comprising a pair of annular flanges secured to each element and disposed to be joined in face-to-face relation, a ring clamp of two separate parts of U-shaped section adapted to fit over said flanges and join the latter in face-to-face relation, a toggle device joining corresponding ends of said parts and manually operable to vary within a fixed limit the circumferential dimension of the clamp and the effective clamping thereof, a bolt pivotally secured to the other end of one of said parts, a recessed split lug projecting from the corresponding end of the other of said parts and disposed to receive said bolt, a threaded member relatively movable by turning on said bolt and into and out of a recess formed in said lug, the adjustment of said member on said bolt selectively determining the effective circumferential dimension of the clamp within the fixed limits of said toggle device and the withdrawal of said member from said recess allowing for opening of the clamp and the removal of the clamp from said flanges for disjoining the machine elements, and a nut turnable on said bolt and adapted to be engaged by said lug as a fixed stop limiting the first named adjustment of said threaded member whereby the circumferential dimension of the clamp may be repeatedly reestablished as previously adjusted.

References Cited in the file of this patent

UNITED STATES PATENTS

| Number | Name | Date |
|---|---|---|
| 162,683 | Nichols | Apr. 27, 1875 |
| 2,091,916 | Evans | Aug. 31, 1937 |
| 2,305,994 | Richards | Dec. 22, 1942 |
| 2,479,580 | Marco | Aug. 23, 1949 |